US008937027B2

(12) United States Patent
Dick et al.

(10) Patent No.: US 8,937,027 B2
(45) Date of Patent: Jan. 20, 2015

(54) BOROSILICATE GLASS COMPOSITION FOR PRODUCING GLASS TUBES AND ITS USE FOR PRODUCING GLASS TUBES AND AS OUTER TUBE FOR LAMPS

(75) Inventors: Erhard Dick, Pechbrunn (DE); Joerg Hinrich Fechner, Mainz (DE)

(73) Assignee: Schott AG, Mainz (DE)

( * ) Notice: Subject to any disclaimer, the term of this patent is extended or adjusted under 35 U.S.C. 154(b) by 214 days.

(21) Appl. No.: 13/594,945

(22) Filed: Aug. 27, 2012

(65) Prior Publication Data

US 2013/0225389 A1 Aug. 29, 2013

(30) Foreign Application Priority Data

Aug. 25, 2011 (DE) .......................... 10 2011 081 532

(51) Int. Cl.
*C03C 3/091* (2006.01)
(52) U.S. Cl.
CPC ...................................... *C03C 3/091* (2013.01)
USPC .................. 501/66; 501/65; 501/67; 313/636
(58) Field of Classification Search
CPC ........ C03C 3/089; C03C 3/091; C03C 3/093; H01J 17/16
USPC ................. 501/65, 66, 67; 313/636
See application file for complete search history.

(56) References Cited

U.S. PATENT DOCUMENTS

| 5,039,631 | A | * | 8/1991 | Krashkevich et al. | .......... 501/64 |
| 6,815,385 | B2 | * | 11/2004 | Kosokabe et al. | ............. 501/21 |
| 7,951,312 | B2 | * | 5/2011 | Ott et al. | ....................... 252/588 |
| 2005/0061033 | A1 | * | 3/2005 | Petrany et al. | ................ 65/134.9 |
| 2007/0213195 | A1 | * | 9/2007 | Hikata et al. | ..................... 501/67 |
| 2009/0191413 | A1 | * | 7/2009 | Tratzky et al. | ................ 428/428 |

FOREIGN PATENT DOCUMENTS

| AT | 006924 | 5/2004 |
| DE | 102008006785 | 6/2009 |
| DE | 102008002082 | 12/2009 |
| DE | 102009021116 | 11/2010 |
| EP | 1266872 | 12/2002 |

OTHER PUBLICATIONS

Derwent Abstract 2009-R85262, abstract of DE 10 2008 002 082 A1, Dec. 3, 2009.*
European Office Action dated Mar. 31, 2014 corresponding to European Patent No. 12 181 123.6-1355 with English translation, 10 pp.
European Search Report dated Dec. 12, 2012 corresponding to European Patent Application No. 12181123.6-1218.
English Translation of Office Action dated Apr. 26, 2012 corresponding to German Patent Application No. 10 2011 081 532.5.
Office Action dated Apr. 26, 2012 corresponding to German Patent Application No. 10 2011 081 532.5.

* cited by examiner

*Primary Examiner* — Karl Group
*Assistant Examiner* — Elizabeth A Bolden
(74) *Attorney, Agent, or Firm* — Ohlandt, Greeley, Ruggiero & Perle, LLP

(57) ABSTRACT

A glass composition and its use for producing glass tubes is provided. The glass tubes having the provided composition are particularly suitable for the outer tubes of fluorescent lamps in the case of which a phosphor layer is baked at temperatures of up to 700° C. The tubes composed of the glass of the provided composition have a lower tendency to deform or stick together when processed at high temperatures. To obtain the observed effects, the molar ratio of $Na_2O/(Na_2O+K_2O)$, inter alia, is greater than 0.4 and not more than 0.72.

16 Claims, No Drawings

BOROSILICATE GLASS COMPOSITION FOR PRODUCING GLASS TUBES AND ITS USE FOR PRODUCING GLASS TUBES AND AS OUTER TUBE FOR LAMPS

CROSS REFERENCE TO RELATED APPLICATIONS

This application claims benefit under 35 U.S.C. §119(a) of German Patent Application No. 10 2011 081 532.5, filed Aug. 25, 2011, the entire contents of which are incorporated herein by reference.

BACKGROUND OF THE INVENTION

1. Field of the Invention

The invention relates to a glass composition having optimized processing properties as are advantageous, in particular, for producing outer tubes for fluorescent lamps and the use of this glass for producing tubes and for lamp outer tubes.

2. Description of Related Art

A widespread type of fluorescent lamp operates according to the principle of low pressure gas discharge. Here, a small amount of mercury and a gas mixture containing noble gas are introduced into an evacuated hollow space. The mercury atoms are excited and then emit ultraviolet radiation (UV). This is converted into visible light by a phosphor coating which is usually applied to the inside of the container. The gas-filled container is preferably configured as an elongated, thin, cylindrical tube and its walls are made of glasses which are very transparent to visible light. Miniaturized fluorescent lamps having an external diameter of a few millimeters (mm) are frequently used for background illumination in screens and VDUs and other display elements. The phosphor coating mentioned is baked onto the interior surface of the glass tubes. Corresponding fluorescent lamps are therefore also referred to as luminophore lamps.

The temperatures reached in lamp production, in particular in the baking of the phosphor layer, can sometimes be up to 700 degrees Celsius (° C.). Such temperatures are usually significantly above the transition temperature of most glasses used for such purposes. The strength and stability of the glass therefore decrease.

The high temperatures required during baking of the phosphor layer are sometimes up to about 150° C. above the glass transition temperature ($T_g$) of the glasses usually used for this purpose. Due to the high baking temperature, the glass structure of the glasses used changes, which can lead to geometric changes and also to changes in the glass surface. When processing the glass tubes to give fluorescent lamps, these can change in length due to shrinkage, become crooked or glass tubes which are in contact stick to one another at the points of contact. All these undesirable effects are highly undesirable and troublesome in the generally highly automated processes for lamp production.

SUMMARY

It is therefore an object of the present invention to provide a glass composition which can be drawn to form glass tubes by conventional processes such as the Vello process or the Danner process, with these glass tubes ideally having little tendency to undergo geometric changes (shrinkage and curvature) and stick to one another at further processing temperatures up to 700° C.

This object is achieved by the glass composition provided herein where, unless indicated otherwise, the proportions indicated are in mol % on an oxide basis.

The silicon dioxide $SiO_2$ content is 74-81 mol %.

The proportion of boron oxide $B_2O_3$ is 8.5-14.5 mol %. This boron content is relatively low compared to the glasses otherwise used for producing the outer tubes of fluorescent lamps, in particular low-pressure gas discharge lamps. This firstly has a favorable effect on the raw materials costs and production costs and secondly the abovementioned sticking together of the contact points of glass tubes in contact with one another is also reduced. It has been found that the sticking of the glass surfaces occurs to a particularly great extent when accumulations of boron are present at the glass surface. This effect is reduced by selection of a relatively low boron content.

The proportion of aluminium oxide $Al_2O_3$ is 0.5-3.5 mol %.

As alkali metal oxides, the glass of the invention comprises sodium oxide $Na_2O$ in proportions of 1.5-3.5 mol % and potassium oxide $K_2O$ in proportions of 1.0-2.0 mol %.

The glass can optionally also contain small proportions of lithium oxide $Li_2O$, preferably 0 to about 1 mol %. Since lithium oxide is a relatively expensive raw material compared to the oxides of sodium and potassium, the proportion thereof will preferably be kept small.

Alkaline earth metal oxides present are: magnesium oxide MgO in proportions of 0.5-1.5 mol %, calcium oxide CaO likewise in amounts of 0.5-1.5 mol %, while barium oxide BaO can, entirely optionally, be present in proportions of 0-0.6 mol %.

The titanium dioxide $TiO_2$ which has, inter alia, an effect on the UV transmission of a glass is present in proportions of 2.0-3.5 mol %.

In addition, a proportion of 0-1.0 mol % of zirconium dioxide $ZrO_2$ can optionally be present in the glass of the invention. $ZrO_2$ increases the resistance of the glass of the invention to attack by water.

In addition, conventional refining agents can be added in customary amounts to the glass of the invention. Possibilities here are, in particular, antimony oxide $Sb_2O_3$ in proportions of 0-0.15 mol % and/or cerium oxide $CeO_2$ in proportions of 0-0.5 mol % and also tin oxide $SnO_2$ in proportions of likewise 0-0.5 mol %. In addition or instead, conventional volatile refining agents such as chlorides and sulphates can also be added to the glass melt. Preference is given to carrying out arsenic-free refining of the glass, as a result of which the glass preferably does not contain any arsenic oxide $As_2O_3$. When antimony oxide is used for refining titanium-containing glasses, this does not lead to undesirable discoloration of the glass because of the high oxidation potential of antimony oxide. Formation of undesirable ilmenite ($FeO.TiO_2$) is greatly minimized thereby.

Many starting materials and raw materials for the production of a glass melt contain iron oxide $Fe_2O_3$ as accompanying constituent or impurity. The iron content of the glass, on an oxide basis, is preferably restricted to a maximum amount of 300 parts per million (ppm).

Cold cathode fluorescent lamps are, for example, produced with external electrodes, which are known as EEFL or external electrode fluorescent lamp type, or with internal electrodes, which are known as CCFL or cold cathode fluorescent lamp type. Particularly in the case of lamps having internal electrodes, the metallic electrodes or their metallic connection wires have to be passed in a gastight manner through the outer tube and joined to the latter. To avoid destruction of the lamp by stresses occurring at the connection points in the event of relatively large temperature changes, the coefficients of expansion of the two components of the joined metal and glass have to be matched to one another. The glasses of the invention having the present composition are particularly suitable for fusion onto tungsten which is frequently used as a material for the lead-throughs. Their average coefficient of thermal expansion a in the range from 20 to 300° C. is preferably in the range from 3.4 to $4.3 \times 10^{-6}$/K.

It is known that alkali metal ions have, owing to their small size, a higher mobility in the glass structure than many other components of the glass. It is also known that the various alkali metals have different mobilities relative to one another. Particularly at high temperatures, in the case of large temperature changes or high temperature gradients, as can occur, for example, in the baking of a phosphor layer, this can result in increased migration of alkali metal ions in the glass structure. Particularly as a result of local inhomogeneities in the alkali metal distribution at the glass surface, these phenomena can cause undesirable shrinkage or sticking together of the glass. It has been found that particularly advantageous processing properties of the glass are obtained when the molar ratio of $Na_2O$ to $(Na_2O+K_2O)$ is in the range from greater than 0.4 to less than or equal to 0.72. The upper limit to the abovementioned molar ratio is preferably less than 0.70.

The ratio of the alkali metal contents also influences the viscosity n of a glass at a given temperature. The temperature at which $\log(\eta/dPas)$ equals 12 is referred to as the softening point. In the case of the glasses of the invention, it is preferably at least 570° C., with the range 580-620° C. being particularly preferred. High softening points are desirable for the dimensional stability and the processing properties of glass tubes, in particular in high-temperature processes.

The working point (WP), defined as the temperature at which the viscosity $\eta$ is 104 decaPascal seconds (dPas), of a glass according to the invention is preferably at least 1170° C.

Apart from the alkali metals sodium and potassium, lithium and its compounds is also a possible raw material for production of the glass. The ratio $B_2O_3/(B_2O_3+\Sigma$ alkali metal oxides) has a significant influence on the vaporization rate of a glass surface at high temperatures as in, for example, melting or hot forming, e.g. drawing of glass tubes by the Danner or Vello process. In the case of the glasses of the invention, the ratio is preferably less than 0.76, particularly preferably 0.6-0.7. In the case of an unfavourable ratio, the processing of the glasses, e.g. in lamp production, can be adversely affected, in particular by sticking together of heated glass surfaces.

A further parameter for influencing or describing the degree of vaporization, especially of alkali metal borates, from a free glass surface is given by the product $(B_2O_3.\Sigma$ alkali metal oxides). It is preferably in the range from 45 to 65.

The molar ratio of $Si_2O_3/Al_2O_3$ is critical to the melting behavior of the glass. The higher the ratio, the more readily meltable is the glass. In the case of the present glasses of the invention, it is preferably less than 105, in particular 70-100.

To ensure very rapid and uniform uptake of heat, as is required, for example, during heating-up for the baking process for the phosphor coating, minimum thermal conductivity values of greater than 0.97 W/m·K are preferred.

The molar ratio of the sum of the alkaline earth metal oxides to the sum of the alkali metal oxides gives a person skilled in the art information on the glass structure and on the bonding. The ratio of the two abovementioned sums is preferably greater than 0.35 but not greater than 0.8.

A further parameter which influences the meltability of a glass is the molar ratio of aluminium oxide to the sum of the alkali metal oxides. The ratio of $Al_2O_3/(Na_2O+K_2O+Li_2O)$ according to the invention is preferably in the range from 0.15 to 0.6.

Five examples of compositions of glasses according to the invention and their important properties and parameters are given in the two tables below. All proportions are in mol % on an oxide basis.

TABLE 1

| Sample No. | 1 | 2 | 3 | 4 | 5 |
| --- | --- | --- | --- | --- | --- |
| $SiO_2$ | 76.9 | 74.8 | 75.9 | 80.1 | 76.8 |
| $B_2O_3$ | 13.1 | 14.3 | 13.6 | 9.4 | 9.9 |
| $Al_2O_3$ | 0.74 | 2.2 | 1.1 | 0.9 | 2.2 |
| $Na_2O$ | 3.24 | 1.75 | 2.85 | 3.00 | 3.25 |
| $K_2O$ | 1.27 | 1.83 | 1.40 | 1.32 | 1.67 |
| $Li_2O$ | 0 | 0.84 | 0 | 0.83 | 0.84 |
| MgO | 0.62 | 0.62 | 1.40 | 0.62 | 0.94 |
| CaO | 0.78 | 0.80 | 1.00 | 1.44 | 1.13 |
| BaO | 0 | 0.46 | 0.33 | 0 | 0 |
| $TiO_2$ | 3.29 | 2.30 | 2.36 | 2.33 | 3.16 |
| $Sb_2O_3$ | 0.06 | 0.1 | 0.06 | 0.06 | 0.11 |
| TOTAL | 100 | 100 | 100 | 100 | 100 |

TABLE 2

| Sample No. | 1 | 2 | 3 | 4 | 5 |
| --- | --- | --- | --- | --- | --- |
| WP [° C.] | 1150 | 1170 | 1170 | 1190 | 1190 |
| Softening point [° C.] at $\log(\eta)= 12$ | 585 | 570 | 610 | 580 | 570 |
| Tg [° C.] | 520 | 515 | 525 | 530 | 520 |
| α (20-300° C.) [$10^{-5}$/K] | 3.8 | 3.8 | 3.9 | 4.1 | 4.3 |
| Water resistance | + | +++ | ++ | +++ | ++ |
| Influence of the $B_2O_3$ content on lamp production | small | greater | great | very small | small |
| Thermal conductivity [W/m·K] | 0.972 | 1.031 | 1.029 | 1.047 | 0.991 |
| $Na_2O/(Na_2O + K_2O)$ | 0.72 | 0.49 | 0.67 | 0.69 | 0.66 |
| $B_2O_3/(B_2O_3 + \Sigma$ alkali metal oxides) | 0.74 | 0.76 | 0.76 | 0.65 | 0.63 |
| $B_2O_3 \times (Na_2O + K_2O + Li_2O)$ | 59.1 | 63.3 | 57.8 | 48.4 | 57.0 |
| $SiO_2/Al_2O_3$ | 103.9 | 34.0 | 69.0 | 89.0 | 34.9 |
| $Al_2O_3/(Na_2O + K_2O + Li_2O)$ | 0.16 | 0.50 | 0.26 | 0.17 | 0.38 |
| $(CaO + MgO + BaO)/(Na_2O + K_2O + Li_2O)$ | 0.31 | 0.43 | 0.64 | 0.40 | 0.36 |
| $CaO/(CaO + MgO)$ | 0.56 | 0.56 | 0.42 | 0.70 | 0.54 |

Relative qualitative assessment of the water resistance of the glass: "+" good; "++" better; "+++" very good.

The examples listed in the table were all refined using antimony as refining agent. Possible alternative refining agents are, in particular, cerium and tin, both individually and in combination with one another and in combination with other conventional refining agents. However, refining by means of antimony is preferred, especially in the case of titanium-containing glasses.

What is claimed is:

1. A borosilicate glass comprising, in mol % on an oxide basis:

$SiO_2$ 74-81;
$B_2O_3$ 8.5-14.5;
$Al_2O_3$ 0.5-3.5;
$Na_2O$ 1.5-3.5;
$K_2O$ 1.0-2.0;
$Li_2O$ 0-1.0;
MgO 0.5-1.5;
CaO 0.5-1.5;
BaO 0-0.6;
$TiO_2$ 2.0-3.5;
$ZrO_2$ 0-1.0, and as refining agents
$Sb_2O_3$ 0-0.15;
$CeO_2$ 0-0.5; and
$SnO_2$ 0-0.5, and having a molar ratio of $Na_2O/(Na_2O+K_2O)$ that is greater than 0.4, but less than 0.72.

2. The borosilicate glass according to claim 1, wherein the molar ratio of $Na_2O/(Na_2O+K_2O)$ is less than 0.70.

3. The borosilicate glass according to claim 1, further comprising a softening temperature at which log (η) equals 12 is at least 570° C.

4. The borosilicate glass according to claim 1, further comprising a softening temperature at which log (η) equals 12 is between 580° C. and 620° C.

5. The borosilicate glass according to claim 1, further comprising a molar ratio of $B_2O_3/(B_2O_3+\Sigma$ alkali metal oxides) that is less than or equal to 0.76.

6. The borosilicate glass according to claim 1, further comprising a molar ratio of $B_2O_3/(B_2O_3+\Sigma$ alkali metal oxides) that is from 0.6 to 0.7.

7. The borosilicate glass according to claim 1, further comprising a molar ratio of $SiO_2/Al_2O_3$ that is less than 105.

8. The borosilicate glass according to claim 1, further comprising a molar ratio of $SiO_2/Al_2O_3$ that is from 70 to 100.

9. The borosilicate glass according to claim 1, further comprising a thermal conductivity that is greater than 0.97 W/m·K.

10. The borosilicate glass according to claim 1, further comprising a molar ratio of $(CaO+MgO+BaO)/(Li_2O+Na_2O+K_2O)$ that is greater than 0.35 to a maximum of 0.8.

11. The borosilicate glass according to claim 1, further comprising a coefficient of thermal expansion ($\alpha_{20/300}$) that is from $3.4\times10^{-6}$/K to $4.3\times10^{-6}$/K and a working point (WP) of at least 1170° C.

12. The borosilicate glass according to claim 1, further comprising a product $B_2O_3\cdot(Li_2O+Na_2O+K_2O)$ that is in the range from 45 to 65.

13. The borosilicate glass according to claim 1, further comprising a molar ratio of $Al_2O/(Li_2O+Na_2O+K_2O)$ that is in the range from 0.15 to 0.6.

14. The borosilicate glass according to claim 1, wherein the glass is suitable for use as a glass tube.

15. The borosilicate glass according to claim 1, wherein the glass is suitable for use as an outer tube of a fluorescent lamp.

16. The borosilicate glass according to claim 1, wherein the glass is suitable for use as an outer tube of a low-pressure gas discharge lamp.

* * * * *